United States Patent

Thiele

[15] 3,638,206

[45] Jan. 25, 1972

[54] DOMAIN PROPAGATION ARRANGEMENT

[72] Inventor: Alfred Almstedt Thiele, East Orange, N.J.

[73] Assignee: Bell Telephone Laboratories Incorporated, Murray Hill, Berkeley Heights, N.J.

[22] Filed: May 8, 1970

[21] Appl. No.: 35,747

[52] U.S. Cl. ..............340/174 TF, 340/174 HA, 340/174 SR, 340/174 YC

[51] Int. Cl. ....................................G11c 19/00, G11c 11/14

[58] Field of Search ...............................340/174 SR, 174 TF

[56] References Cited

UNITED STATES PATENTS 3,516,077 6/1970 Bobeck et al. ...................340/174 SR

*Primary Examiner*—James W. Moffitt
*Attorney*—R. J. Guenther and Kenneth B. Hamlin

[57] ABSTRACT

Single wall domains are moved in a slice of magnetic material by changing magnetic pole patterns in a soft magnetic overlay in response to a magnetic field reorienting in the plane of the slice. Several overlay geometries are described for achieving improved operation and for a fuller utilization of the potential of presently available photolithographic techniques.

13 Claims, 5 Drawing Figures

INVENTOR
A.A. THIELE
BY Herbert M. Shapiro
ATTORNEY

DOMAIN PROPAGATION ARRANGEMENT

FIELD OF THE INVENTION

This invention relates to magnetic memory arrangements and more particularly to such arrangements including magnetic materials in which single wall domains can be moved.

BACKGROUND OF THE INVENTION

A single wall domain as well as movement thereof in a two-dimensional shift register arrangement is described in U.S. Pat. No. 3,460,116 issued Aug. 5, 1969 to A. H. Bobeck, U. F. Gianola, R. C. Sherwood, and W. Shockley. Such a domain is bounded by a single domain wall which closes on itself to form a stable entity free to move in the plane of the material in which it is defined.

A typical material in which a single wall domain can be moved is a rare earth orthoferrite such as yttrium or terbium orthoferrite or a garnet. A characteristic of such materials when formed in thin slices appropriate for the movement of single wall domains is a preferred direction of magnetization along an axis normal to the plane of the slice. For such a material, a single wall domain has its magnetization in a first direction, say a positive direction, along that axis while the remainder of the material is in a second (negative or reference) direction along that axis. A domain appears as a colored disc when observed through a microscope with polarized light and may be visualized as a circle which represents the encompassing domain wall.

The movement of a single wall domain in, for example, an orthoferrite is accomplished by the generation of consecutively offset magnetic fields (gradients). One implementation for providing such fields comprises a sequence of conductor loops offset from one another in the direction of propagation for a domain. The conductors are pulsed in sequence for moving a domain. Such loops can, of course, be connected in series in a familiar three-phase manner for moving domain patterns in a shift register operation.

An alternative implementation for moving domains utilizes a structured magnetically soft overlay on the surface of a material in which single wall domains can be moved. The overlay is of a repetitive geometry such that an appropriate magnetic pole pattern is generated in it in response to a magnetic field in the plane of the material. As the inplane field is reoriented in the plane of the material, the pole pattern in the overlay changes. A judicious selection of the overlay geometry to correspond to the consecutive orientations of the inplane field permits a domain or domain pattern to be advanced along prescribed propagation channels.

A variety of overlay patterns has been provided for achieving the desired domain movement in response to a reorienting inplane field. One arrangement, for example, is for repetitive spaced apart bar and T-shaped overlays responding to a rotating inplane field. This arrangement is disclosed in copending application Ser. No. 732,705, filed May 28, 1968 for A. H. Bobeck, now U.S. Pat. No. 3,534,347. The bar and T-shaped overlays are designed to concentrate magnetic poles at the ends of the elements aligned with the inplane field as that field rotates. The poles cause a drive field (gradient) which moves the domains.

It has been found that the maximum effective drive field produced by the bar and T-shaped overlay in this manner is relatively low with respect to that produced by the conductor array. Moreover, it has been found that practical limitations in photolithographic techniques employed in the fabrication of such an overlay reduce the use of such a technique for the movement of very small diameter domains as, for example, on the order of microns at the present time. To be more specific, materials exist in which domains have diameters so small that the photoresist technique is presently capable of producing correspondingly dimensioned overlays to effect the movement of those domains only with considerable difficulty.

A prime object of this invention, accordingly, is to provide a domain propagation circuit including an overlay with a geometry to generate a relatively high-drive field in response to a reorienting inplane field and to take better advantage of available photoresist techniques.

BRIEF DESCRIPTION OF THE INVENTION

This invention takes advantage of the realization that overlays having geometries to exhibit distributed magnetic pole concentrations rather than abrupt concentrations, as is the case, for example, with T-shaped and bar overlay geometries, permit improved operating parameters and that these other shapes can be achievable at present in the relatively small sizes necessary for moving domains in the order of microns. This realization permits a domain propagation channel to be defined by a sequence of, for example, petal-shaped overlays laterally offset with respect to one another along the axis of the propagation channel.

In another aspect of this invention it was realized that domain motion is fostered and operating margins improved if a domain moves in a manner to contact a relatively constant area of the magnetically soft overlay continuously throughout its movement along a channel. An embodiment in accordance with this aspect, accordingly, provides for a uniform magnetically soft overlay film with a sequence of petal-shaped apertures in the film defining the propagation channel. The apertures may be thought of as the negative of the petal-shaped overlay above.

A modification of that negative geometry is shown in another embodiment in which the apertures in an overlay film assume a duckpin shape for achieving further improvements in operation.

In still another embodiment, both positive and negative overlay patterns are disposed, in complementing positions, on opposite surfaces of a slice of material in which a domain propagation channel is defined.

DETAILED DESCRIPTION

Figure 1:
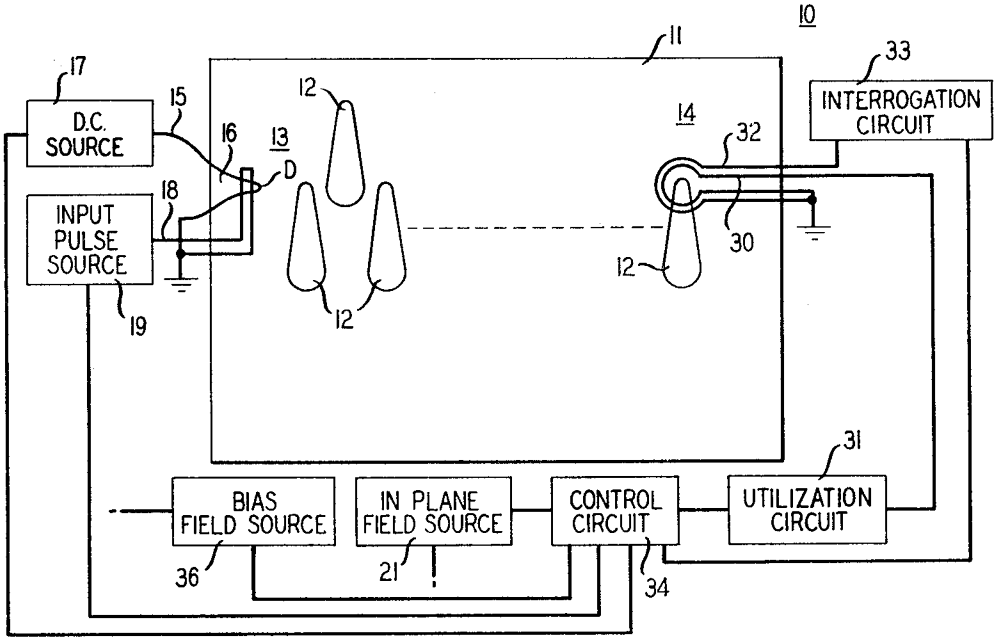
FIG. 1 shows a schematic illustration of a domain propagation device in accordance with this invention.

FIG. 1 shows a domain propagation arrangement 10 in accordance with this invention. The arrangement includes a slice of material 11 in which single wall domains can be moved. Spaced apart petal-shaped overlay elements 12 are positioned on the surface of slice 11 between input and output positions 13 and 14, respectively. Typically, the overlay is deposited on a suitable substrate such as glass and juxtaposed with slice 11. Permalloy is a suitable overlay material.

The input position for the illustrative propagation channel is defined at 13 in FIG. 1. A conductor 15 outlines an area 16 and is connected between a DC source 17 and ground. Area 16 is of positive magnetization to correspond to the assumed magnetization of single wall domains in sheet 11. Direct current source 17 applies a current to conductor 15 to maintain this magnetization. The remainder of sheet 11 is initially assumed negative as mentioned above.

An additional conductor 18, of a hairpin geometry, intersects area 16. Conductor 18 is connected between an input pulse source 19 and ground. Source 19, in operation, pulses conductor 18 to drive the portion of area 16 within the hairpin to a negative magnetization, thus detaching a tip portion D of FIG. 1 for movement along the propagation channel in response to a reorienting inplane field. Tip portion D becomes a single wall domain representing a binary one. The absence of a pulse on conductor 18 during a particular cycle of the inplane field results in the absence of a domain representing a binary zero. As the inplane field reorients, a domain pattern, so generated, advances along the channel. The inplane field, reorienting illustratively by rotation, is generated by familiar means represented by block 21 of FIG. 1. Consecutive rotations of this field advance a domain pattern determined at 13 to the output position 14 for detection.

The output position is defined, illustratively, by a conductor 30 including a loop which encompasses a position on a terminal petal-shaped element as shown in the figure Conductor 30 is connected between a utilization circuit 31 and ground. A conductor 32 also includes a loop which encompasses the same portion of the terminal petal-shaped element. Conductor 32 is connected between an interrogation circuit 33 and ground. In operation, interrogation circuit 33 pulses conductor 32 in a manner (preferably first to expand and then) to collapse domains in the encompassed position. If a domain is present to be collapsed, a pulse is generated in conductor 30 for detection by circuit 31. Alternatively, Hall effect type or optical detectors may be employed for the detection operation.

The various sources and circuits are connected to a control circuit 34 for synchronization and activation; the sources and circuits may be any such elements capable of operating in accordance with this invention.

Figure 2:
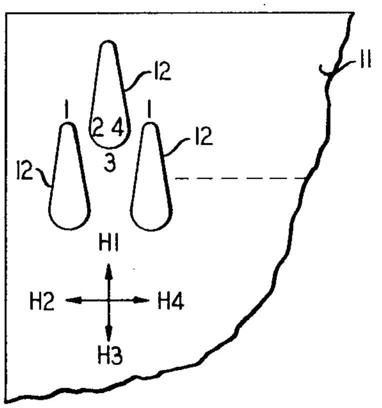
FIGS. 2, 3, and 4 show alternative overlay configurations for the arrangement of FIG. 1.

The movement of a domain along a channel defined by petal-shaped elements in accordance with this invention is illustrated in FIG. 2. The figure shows a portion of slice 11 of FIG. 1 with a representative number of petal-shaped elements on its surface. The figure also shows a number of arrows H in different orientations. The arrows represent inplane field orientations and the designations associated with the arrows include numerals which indicate the consecutive orientations for the field. A domain following the changing pole patterns caused by a field so reorienting (counterclockwise) moves to consecutive positions designated 1, 2, 3, and 4 in FIG. 2.

The movement of domains by the "attraction" of magnetic poles which change positions in overlay elements in response to a reorienting inplane field depends on the creation of field gradients across the domains. This gradient is a result of a change in a bias field (aligned with the domain magnetization) over the diameter of the domain. The change is due to the pole concentrations generated by the inplane field and depends on the coupling between the poles and the bias field. The bias field is generated by well-known means represented in FIG. 1 by block 36. It has been found that the smoother the (change in bias field) gradient, the greater the coupling efficiency between the poles and the bias field (or the larger the total field difference for a given inplane field) and the less the drive necessary to produce the field gradient. Such considerations lead to overlay elements which include no abrupt changes in geometry and thus exhibit a distributed pole configuration.

The elimination of extraneous regions of high-magnetic field gradients (smoothing the field) is also desirable since such regions could result in the deformation of a domain to an undesired shape. Such a deformation, in turn, could result in the portion of a domain moving to an alternative position causing ambiguous information representations. In accordance with this invention, a pole distribution to correspond to a smooth field gradient minimizes domain deformation.

When the overlay comprises spaced apart magnetically soft elements as shown in FIG. 2, the simplest geometry which provides the desired distributed pole configuration is the petal shape shown. The petal geometry has the advantage that it better utilizes the potential of the photoresist techniques than does a T-bar overlay.

A comparison between the T-shaped and bar overlay elements on the one hand and the petal-shaped element on the other, for example, illustrates the advantage of the latter when small dimensions are desired. One characteristic of photoetching is that the etch undercuts the etched surface. This undercutting equals, in extent, the thickness of the film etched. For example, if a film is one-tenth mil thick, the etch undercuts the film by one-tenth mil. For a T-shaped or bar element having narrow dimensions, undercutting from both sides results in a destruction of the element if it is not substantially wider than two-tenths mil. Such considerations limit the dimensions realizable if T-shaped and bar elements are employed.

A petal-shaped element, on the other hand, has no narrow dimensions to be undercut as does the bar for example (viz, parallel sides). Therefore, if the photoresist technique permits the realization of overlays having patterns with, for example, three-tenths mil repeats, the narrow dimensions of the T-shaped and bar geometries would be entirely undercut and thus destroyed, whereas petal geometries would virtually be unaffected if not advantageously affected by a further reduction in size.

Figure 3:
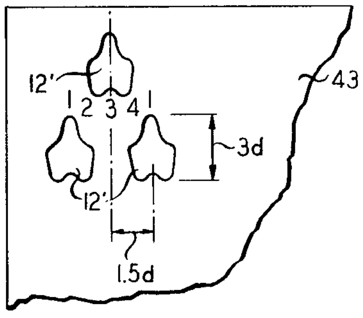

Typical dimensions for spaced apart permalloy elements of FIG. 2 indicate the resolution presently realizable. The dimensions as shown in FIG. 3 are in terms of domain diameter *d*. The repeat for the overlay pattern can be seen to be three diameters or as little as three microns for a one micron domain. One-tenth micron resolution is within the capabilities of the art if an electron microscope is used. The sizes are controlled by the resolution of the optical system or electron system and the domain size is matched. For a given resolution somewhat smaller petals can be made, down perhaps by a factor of two in area over a bar and T-shaped overlay. Each petal element is formed by interconnecting large and small semicircles having radii of $1.5d$ and $0.5d$ and centers spaced apart $3d$ where $d=$ the domain diameter.

FIG. 3 shows a similar overlay where elements 12' are defined as apertures in a continuous magnetically soft overlay which is, in principle, the negative of FIG. 2. The negative overlay pattern of FIG. 3 is shown with apertures of a geometry different from the petal shape of FIG. 2. The representative aperture is a duckpin shape familiar in bowling illustratively having an indentation *i* and relatively flat sides in its enlarged base portion. The duckpin-shaped aperture acts to confine slightly the distributed poles to proper consecutive positions in response to the inplane field. In the absence of this type of geometry, the magnetic flux lines in the overlay may merely bend around narrow petal-shaped apertures without giving rise to the requisite poles at low fields and may provide less reliable propagation at high fields.

The duckpin apertures have the overall dimensions comparable to those of the petal overlays. Typical dimensions for the duckpin apertures are $15\mu$ across, by $30\mu$, $1\mu$ thick for $10\mu$ domains as indicated in FIG. 3.

Another important consideration in selecting an overlay geometry is that the domain dipole moment itself generates a field which couples it to the overlay. Any change in the amount of overlay coupled by the domain produces a force on the domain. This force produces a stickiness, causing hesitation in the domain movement, which is overcome by increased drive fields. An overlay geometry which permits a domain to couple a constant area of overlay reduces this stickiness. With the negative overlay of FIG. 3, not only is the potential of photolithographic techniques more fully utilized to achieve high-packing densities but also a domain is moving constantly at least partially beneath magnetically soft material and there is little change in the area of overlay contacted by the domain as the domain moves. A glance at FIG. 3 shows that the overlay is a continuous film (43) with apertures (12') present to determine pole patterns. The apertures conveniently account for up to half of the overlay defining a constant area path of overlay material for a domain to follow from input to output.

The forces on the domain which result from the dipoles induced in the overlay by the domain itself can be shown to be more uniform for overlay elements shaped in accordance with this invention when compared with corresponding forces in, for example, the T-shaped and bar overlay mentioned above. This uniformity leads to a reduction in stickiness which permits an increase in the pole density induced by the inplane field, an advantage realized by, for example, making the overlay relatively thick (or wide, 50 percent of the surface area defining the maximum width). The effective maximum drive field on a domain in this configuration may approach the strength of the field produced by drive conductors. To be specific, the elimination of the stickiness (conductors have none) and the increase in the pole strength achieved by the smoothness (to the pole strength provided by conductors) allows the performance of conductors to be approached; this allows both higher bit rates and packing density. The smoothness of the field gradient produces a smoother and therefore lower loss bit motion allowing the application of higher drive while lowering the required optical resolution.

The following table shows a comparison of typical numbers for various circuits in accordance with this invention with the bar and T-shaped overlay circuit and the conductor circuit described above.

It is to be recognized that it is preferable to have a relatively

TABLE

| Material | Yttrium Orthoferrite | | | |
|---|---|---|---|---|
| Domain size, mils | 4 | 4 | 4 | 4. |
| Bias field, oersteds | 40 | 40 | 40 | 40. |
| In-plane field | Wires<br>None | Petal<br>12 oersteds | T-bar<br>15 oersteds | Duck-pin.<br>8 oersteds. |
| Drive field | 20 oersteds | 3 oersteds | 2 oersteds | 10 oersteds. |
| Bit rate | 3 megacycles | 500 kc | 300 kc | 1.5 megacycles. |
| Overlay thickness, A | None | 3,000 | 3,000 | 10,000. |

thick overlay to increase the drive field for a given inplane field. When an overlay is designed to produce abrupt poles, however, a maximum drive field, for a given inplane field, is reached quickly. Further increases in overlay thickness only lead to domain deformation and increased domain stickiness. If the overlay geometry is such as to generate a distributed pole, relatively thick overlays can be used without such adverse effects.

Figure 4:
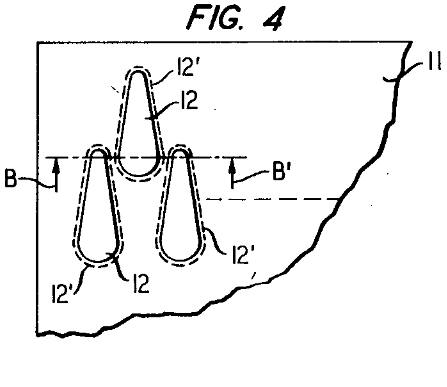
Figure 5:
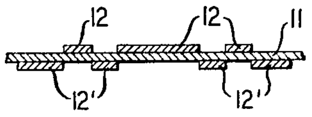
FIG. 5 shows a cross-sectional view of the overlay configuration of FIG. 4.

FIG. 4 shows an alternative overlay arrangement where the petal geometries of both FIGS. 2 and 3 are employed together. To be specific, overlay 12 of FIG. 2 is disposed on the top surface of slice 11 as viewed in FIG. 4 and the overlay of FIG. 3 with apertures 12′ defined therein (shown here in petal form) is disposed on the bottom surface. This arrangement is most clearly shown by the cross-sectional view of the arrangement of FIG. 4 taken along line B—B′ there as shown in FIG. 5. Some marginal overlap of the patterns is desirable but, in any case, the overlay elements and apertures are disposed to attract domain patterns to the same positions in response to a given inplane field. FIGS. 4 and 5 show the elements in representative positions to permit such operation. The arrangement operates in a manner analogous to that described above.

The additional advantages of the arrangements represented by FIGS. 4 and 5 are that the transverse (inplane) field flux is contained within the permalloy except for that which is within the orthoferrite where it is active in moving the domain. The applied field energy is thus efficiently utilized and therefore there is a further reduction in drive power for a given bit rate.

What has been described is considered only illustrative of the principles of this invention. Other and varied modifications can be devised in accordance with those principles within the spirit and scope of this invention.

I claim:

1. A domain wall shift register comprising a first material in which single wall domains can be moved, a first overlay of magnetically soft material adjacent said first material and including a plurality of elements consecutive ones of which are offset laterally from one another along an axis for defining a shift register channel for single wall domains in said first material, each of said elements having a smoothly curved geometry to exhibit a changing distributed pole configuration in response to a field reorienting in the plane of said overlay.

2. A domain wall shift register in accordance with claim 1 wherein each of said elements has a short and a relatively long dimension the later dimension being between boundaries smoothly curved to define distributed pole configurations when said reorienting field is aligned with said long dimension.

3. A domain wall shift register in accordance with claim 2 wherein said elements comprise spaced apart magnetically soft overlays.

4. A domain wall shift register in accordance with claim 3 wherein said elements comprise apertures in a continuous magnetically soft overlay film.

5. A domain wall shift register comprising a first material in which single wall domains can be moved, a first overlay of magnetically soft material adjacent said first material and including a plurality of elements consecutive ones of which are offset laterally from one another along an axis for defining a shift register channel for single wall domains in said first material, each of said elements having a geometry to provide a smooth drive field gradient across a domain coupled thereto in response to a field reorienting in the plane of said overlay.

6. A domain wall shift register comprising a sheet of material in which single wall domains can be moved and having first and second surfaces, a first overlay of magnetically soft material adjacent said first surface, said overlay comprising a plurality of elements each having a long dimension with first and second end portions having relatively small and large diameter semicircular geometries respectively forming a petal shape, consecutive ones of said elements being disposed alike with the long dimension transverse to an axis between input and output positions for said domains and offset from one another such alternate small diameter end portions and large diameter end portions alternate along said axis.

7. A domain wall shift register in accordance with claim 6 wherein said first overlay comprises a plurality of magnetically soft petal-shaped elements spaced apart from one another along said axis.

8. A domain wall shift register in accordance with claim 6 wherein said first overlay comprises a continuous layer of magnetically soft material wherein said petal-shaped elements comprise apertures in said layer.

9. A domain wall shift register in accordance with claim 7 including a second overlay adjacent said second surface, said second overlay comprising a continuous layer of magnetically soft material wherein said petal-shaped elements comprise apertures in said overlay, said apertures being disposed to complement the position of the elements of said first overlay such that elements of said first and second layer act in concert to move domains from said input to said output position in response to a magnetic field reorienting in the plane of said sheet.

10. A domain wall shift register in accordance with claim 6 including means for generating a magnetic field reorienting in the plane of said sheet.

11. A domain wall shift register in accordance with claim 10 also including means for selectively generating said domains at said input positions and means for detecting domains at said output position.

12. A domain wall shift register in accordance with claim 8 wherein the area of said magnetically soft overlay approximately equals the area of the petal-shaped apertures therein.

13. Apparatus comprising a material in which single wall domains can be moved and having a first surface, a continuous overlay film of magnetically soft material adjacent said first surface, and film including apertures spaced apart less than the diameter of a single wall domain in said material and being of a geometry to generate distributed magnetic poles which attract domains from input to output positions in response to a reorienting inplane field, and means for generating said reorienting inplane field in said material.

* * * * *